United States Patent
Guizilini et al.

(10) Patent No.: US 12,175,775 B2
(45) Date of Patent: Dec. 24, 2024

(54) PRODUCING A BIRD'S EYE VIEW IMAGE FROM A TWO DIMENSIONAL IMAGE

(71) Applicant: Toyota Research Institute, Inc., Los Altos, CA (US)

(72) Inventors: Vitor Guizilini, Santa Clara, CA (US); Rares A. Ambrus, San Fransisco, CA (US); Sudeep Pillai, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 526 days.

(21) Appl. No.: 16/898,506

(22) Filed: Jun. 11, 2020

(65) Prior Publication Data

US 2021/0390714 A1 Dec. 16, 2021

(51) Int. Cl.
*G06V 20/64* (2022.01)
*G06F 18/214* (2023.01)
(Continued)

(52) U.S. Cl.
CPC ............ *G06V 20/64* (2022.01); *G06F 18/214* (2023.01); *G06N 3/045* (2023.01); *G06N 3/088* (2013.01);
(Continued)

(58) Field of Classification Search
CPC . G06T 7/269; G06T 7/70; G06T 2207/10028; G06T 2207/20081;
(Continued)

(56) References Cited

U.S. PATENT DOCUMENTS

2002/0146163 A1    10/2002   Frisken et al.
2017/0011280 A1    1/2017    Soldevila et al.
(Continued)

FOREIGN PATENT DOCUMENTS

CN              110334800 A      10/2019

OTHER PUBLICATIONS

Wang et al., "Pseudo-LiDAR from Visual Depth Estimation: Bridging the Gap in 3D Object Detection for Autonomous Driving," 2019 IEEE/CVF Conference on Computer Vision and Pattern Recognition (CVPR), pp. 8445-8453 (2019).
(Continued)

*Primary Examiner* — John W Lee
(74) *Attorney, Agent, or Firm* — Christopher G. Darrow; Darrow Mustafa PC (57) ABSTRACT

A two dimensional image can be received. A depth map can be produced, via a first neural network, from the two dimensional image. A bird's eye view image can be produced, via a second neural network, from the depth map. The second neural network can implement a machine learning algorithm that preserves spatial gradient information associated with one or more objects included in the depth map and causes a position of a pixel in an object, included in the bird's eye view image, to be represented by a differentiable function. Three dimensional objects can be detected, via a third neural network, from the two dimensional image, the bird's eye view image, and the spatial gradient information. A combination of the first neural network, the second neural network, and the third neural network can be end-to-end trainable and can be included in a perception system.

21 Claims, 4 Drawing Sheets

(51) Int. Cl.

| | |
|---|---|
| *G06F 18/2413* | (2023.01) |
| *G06N 3/045* | (2023.01) |
| *G06N 3/084* | (2023.01) |
| *G06N 3/088* | (2023.01) |
| *G06T 7/269* | (2017.01) |
| *G06T 7/50* | (2017.01) |
| *G06T 7/70* | (2017.01) |
| *G06V 10/764* | (2022.01) |
| *G06V 20/56* | (2022.01) |

(52) U.S. Cl.
CPC ............. *G06T 7/269* (2017.01); *G06T 7/70* (2017.01); *G06V 10/764* (2022.01); *G06V 20/56* (2022.01); *G06V 20/647* (2022.01); *G06T 2207/10028* (2013.01); *G06T 2207/20081* (2013.01); *G06T 2207/20084* (2013.01)

(58) Field of Classification Search
CPC . G06T 2207/20084; G06T 2207/10004; G06T 2207/10012; G06T 2207/10048; G06T 2207/30252; G06T 7/50; G06K 9/6256; G06K 9/627; G06N 3/0454; G06N 3/088; G06N 3/084; G06V 20/647; G06V 30/194; G06V 10/764; G06V 20/56; G06V 20/64
See application file for complete search history.

(56) References Cited

U.S. PATENT DOCUMENTS

| | | | | |
|---|---|---|---|---|
| 2017/0330068 | A1* | 11/2017 | Yu | G06F 18/253 |
| 2019/0042943 | A1* | 2/2019 | Dasgupta | G06N 3/084 |
| 2019/0066733 | A1* | 2/2019 | Somanath | G06T 3/4046 |
| 2019/0096125 | A1* | 3/2019 | Schulter | G05D 1/0088 |
| 2019/0147245 | A1* | 5/2019 | Qi | G06V 10/82 382/103 |
| 2019/0266418 | A1* | 8/2019 | Xu | G06V 10/457 |
| 2019/0304102 | A1* | 10/2019 | Chen | G06N 20/00 |
| 2020/0066036 | A1* | 2/2020 | Choi | G06T 17/10 |
| 2020/0074239 | A1* | 3/2020 | Park | G06F 18/217 |

OTHER PUBLICATIONS

Lin et al., "A Vision Based Top-View Transformation Model for a Vehicle Parking Assistant," Sensors 2012, pp. 4431-4446, vol. 12.
Juneja et al., "Performance Evaluation of Edge Detection Techniques for Images in Spatial Domain," International Journal of Computer Theory and Engineering, Dec. 2009, pp. 614-621, vol. 1, No. 5.
Zhao et al., "Object Detection with Deep Learning: A Review," pp. 1-21, arXiv:1807.05511v2 [cs.CV] Apr. 16, 2019.
Jayasuriya et al., "Deep Learning with Energy-efficient Binary Gradient Cameras," pp. 1-9, arXiv:1612.00986v1 [cs.CV] Dec. 3, 2016.
Alazzawi et al., "Performance of Face Recognition System Using Gradient Laplacian Operators and New Feature Extraction Method Based on Linear Regression Slope," Mathematical Problems in Engineering, article ID 1929836, Sep. 24, 2018, 12 pages, vol. 2018.
Godard et al., "Unsupervised Monocular Depth Estimation with Left-Right Consistency," pp. 1-14, arXiv:1609.03677v3 [cs.CV] Apr. 12, 2017.
Zhou et al., "Unsupervised Learning of Depth and Ego-Motion from Video," The IEEE Conference on Computer Vision and Pattern Recognition (CVPR), pp. 1-10 (2017).
Andrew Zisserman, "Self-Supervised Learning," 122 pages.
Ambrus et al., "Two Stream Networks for Self-Supervised Ego-Motion Estimation," pp. 1-12, arXiv:1910.01764v3 [cs.CV] Nov. 19, 2019.
Felp Roza, "End-to-end learning, the (almost) every purpose ML method," pp. 1-9, found at: https://towardsdatascience.com/e2e-the-every-purpose-ml-method-5d4f20dafee4, May 30, 2019 (last accessed Jun. 10, 2020).
Liu, et al., "DDFlow: Learning Optical Flow with Unlabeled Data Distillation," The Thirty-Third AAAI Conference on Artificial Intelligence (AAAI-19), pp. 8770-8777, (2019).
Clark et al., "Nonparametric Continuous Sensor Registration," pp. 1-18, higharXiv: 2001.04286v1 [math.OC] Jan. 8, 2020.
Unknown, "Kernel (image processing)," pp. 1-6, found at: https://en.wikipedia.org/wiki/Kernel_(image_processing) #Convolution, last edited Dec. 7, 2019 (Last accessed Jun. 10, 2020).
Xiaohan Fei, "Inertial-aided Visual Perception of Geometry and Semantics," UCLA Electronic Theses and Dissertations, 162 pages, https://escholarship.org/uc/item/9pd173p9, (2019).
Unknown, "Image gradient," pp. 1-4, https://en.wikipedia.org/wiki/Image_gradient, last edited May 20, 2019 (Last accessed Jun. 10, 2020).
Pavlakos, et al., "Ordinal Depth Supervision for 3D Human Pose Estimation," 2018 IEEE/CVF Conference on Computer Vision and Pattern Recognition (CVPR), 7307-7316 (2018).
Unknown, "Optical flow," pp. 1-6, https://en.wikipedia.org/wiki/Optical_flow, last edited Jan. 24, 2020 (Last accessed Jun. 10, 2020).
Yu et al., "Back to Basics: Unsupervised Learning of Optical Flow via Brightness Constancy and Motion Smoothness," pp. 1-4, arXiv:1608.05842v1 [cs.CV] Aug. 20, 2016.
Unknown, "Training, validation, and test sets," pp. 1-6, https://en.wikipedia.org/wiki/Training,_validation,_and_test_sets, last edited on Feb. 5, 2020 (Last accessed Jun. 10, 2020).
Unknown, "Support-vector machine," pp. 1-19, https://en.wikipedia.org/wiki/Support-vector_machine, last edited Feb. 12, 2020 (Last accessed Jun. 10, 2020).
Yu et al., Risk Assessment and Planning with Bidirectional Reachability for Autonomous Driving, pp. 1-7, arXiv:1909.08059v1 [cs.RO] Sep. 17, 2019.
Unknown, "What does it mean for a neural network to be trained end-to-end?" pp. 1-2, https://www.quora.com/What-does-it-mean-for-a-neural-network-to-be-trained-end-to-end (last accessed Jun. 10, 2020).
Amini, et al., "Variational End-to-End Navigation and Localization," pp. 1-7, arXiv: 1811.10119v2 [cs.LG] Jun. 11, 2019.

* cited by examiner

PRODUCING A BIRD'S EYE VIEW IMAGE FROM A TWO DIMENSIONAL IMAGE

TECHNICAL FIELD

The disclosed technologies are directed to producing a bird's eye view image from a two dimensional image. Specifically, the disclosed technologies are directed to producing a bird's eye view image from a two dimensional image so that these images can be used to detect three dimensional objects.

BACKGROUND

A neural network can be a computing system configured to perform a task using an approach modeled upon a manner in which a brain processes information through neurons. An artificial neuron, also referred to as a node, can be a basic element of the neural network. The node can be configured to receive one or more inputs and to produce an output of a function. Each of the one or more inputs can be multiplied by a value of a weight to produce a weighted input. A sum of weighted inputs can be an argument of the function of the node. The neural network can have nodes arranged in a sequence of one or more layers. Each layer can have one or more nodes. An input layer can receive one or more inputs related to the task to be performed by the neural network. One or more intermediate layers, also referred to as hidden layers, can receive one or more outputs from the input layer. An output layer can receive one or more outputs from the one or more hidden layers and can produce one or more outputs related to the task. If the task is abstract, then the neural network can be configured so that elementary aspects of the task are performed by nodes of hidden layers early in the sequence with increasingly abstract aspects of the task performed by nodes of hidden layers later in the sequence.

The neural network can be trained to minimize an error, also referred to as a loss function, associated with the one or more outputs related to the task. The neural network can receive training inputs related to the task and can produce training outputs related to the task. A value of the loss function can be calculated. The neural network can be trained in different manners including, for example, supervised, unsupervised, or self-supervised. If the neural network is trained in a supervised manner, then the value of the loss function can correspond to a difference between values of the training outputs and values of expected outputs of the neural network in response to a receipt of the training inputs. The values of the expected outputs can be referred to as the ground truth. If the neural network is trained in an unsupervised manner, then the value of the loss function can correspond to a difference between values of the training inputs and values of inputs reconstructed from the values of the training outputs. If the neural network is trained in a self-supervised manner, then the value of the loss function can correspond to a difference between results of similar processes performed on similar inputs. For example, if the task is to produce a depth map from a pair of images that comprise a stereo image, then the loss function can correspond to a difference between: (1) a result of a process to modify a left image to match a right image and (2) a result of a process to modify the right image to match the left image. Similarly, for example, if the task is to produce the depth map from monocular images, then the loss function can correspond to a difference between: (1) a result of a process to modify a monocular image produced at a first time to match a monocular image produced at a second time and (2) a result of a process to modify the monocular image produced at the second time to match the monocular image produced at the first time. Such a loss function can be referred to as a photometric loss.

Training of the neural network can be characterized by two phases. In a forward phase, the neural network can receive the training inputs and can produce the training outputs. In a backward phase, also referred to as backpropagation, values of weights of the nodes can be adjusted so that the value of the loss function, in response to the receipt of the training inputs, can be reduced. The forward phase and the backward phase can be repeated in iterations until the value of the loss function is at a minimum. The loss function can be expressed in terms of the weights used by the neural network. Using backpropagation, an adjustment to the value of a specific weight can be guided by a determination of a partial derivative of the loss function with respect to the specific weight. The specific weight can be associated with a specific input to a specific node of a specific layer. The partial derivative of the loss function with respect to the specific weight can be: (1) a product of a partial derivative of the loss function with respect to a function of a specific output node that produced a training output associated with the specific weight (2) multiplied by one or more partial derivatives of one or more functions of one or more nodes (between the specific node and the specific output node) with respect to one or more inputs of the one or more nodes (3) multiplied by a partial derivative of a function of the specific node with respect to the specific weight. An ability to use backpropagation to guide the adjustment of such a specific weight can depend upon each of: (1) the function of the specific output node, (2) the one or more functions of the one or more nodes (between the specific node and the specific output node), and (3) the function of the specific node with respect to the specific weight being a differentiable function.

SUMMARY

In an embodiment, a system for producing a bird's eye view image from a two dimensional image can include one or more processors communicably coupled to a memory. The memory can store a depth module and a transformation module. The depth module can include instructions that when executed by the one or more processors cause the one or more processors to receive the two dimensional image and to execute a first neural network to produce a depth map. The transformation module can include instructions that when executed by the one or more processors cause the one or more processors to receive the depth map and to execute a second neural network to produce the bird's eye view image. The second neural network can implement a machine learning algorithm that preserves spatial gradient information associated with one or more objects included in the depth map. The second neural network can implement a machine learning algorithm that causes a position of a pixel in an object, included in the bird's eye view image, to be represented by a differentiable function.

In another embodiment, a method for producing a bird's eye view image from a two dimensional image can include receiving, by a processor, the two dimensional image. The method can include producing, by the processor via a first neural network, a depth map from the two dimensional image. The method can include producing, by the processor via a second neural network, the bird's eye view image from the depth map. The second neural network can implement a machine learning algorithm that preserves spatial gradient information associated with one or more objects included in the depth map. The second neural network can implement a machine learning algorithm that causes a position of a pixel in an object, included in the bird's eye view image, to be represented by a differentiable function.

In another embodiment, a non-transitory computer-readable medium for producing a bird's eye view image from a two dimensional image can include instructions that when executed by one or more processors cause the one or more processors to receive the two dimensional image. The non-transitory computer-readable medium can include instructions that when executed by one or more processors cause the one or more processors to produce, via a first neural network, a depth map from the two dimensional image. The non-transitory computer-readable medium can include instructions that when executed by one or more processors cause the one or more processors to produce, via a second neural network, the bird's eye view image from the depth map. The second neural network can implement a machine learning algorithm that preserves spatial gradient information associated with one or more objects included in the depth map. The second neural network can implement a machine learning algorithm that causes a position of a pixel in an object, included in the bird's eye view image, to be represented by a differentiable function.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to producing a bird's eye view image from a two dimensional image. A first neural network can receive the two dimensional image and can produce a depth map. A second neural network can receive the depth map and can produce the bird's eye view image. An illustration in the two dimensional image can be with respect to a height dimension and a width dimension. An illustration in the depth map can be with respect to the height dimension, the width dimension, and a depth dimension. An illustration in the bird's eye view image can be with respect to the depth dimension and the width dimension. In an implementation, a third neural network can receive the two dimensional image and the bird's eye view image and can detect three dimensional objects.

Conventionally, the second neural network can use a classification function to produce the bird's eye view image from the depth map. The classification function can receive information about a voxel in the depth map, can determine if the voxel contributes to an illustration of an object in the depth map, and can produce a classification of a pixel in the bird's eye view image that corresponds to the voxel. In response to a determination that the voxel does contribute to the illustration of an object, the classification can be that the corresponding pixel is occupied. In response to a determination that the voxel does not contribute to the illustration of an object, the classification can be that the corresponding pixel is unoccupied.

Unfortunately, because an output of the classification function is binary (e.g., occupied or unoccupied), the classification function is not a differentiable function. Additionally, because the output of the classification function is binary, the output of the classification function does not preserve spatial gradient information associated with the illustration of the object in the depth map.

Having the classification function not be a differentiable function can preclude an ability to use backpropagation to guide training of the second neural network or a combination of the first neural network and the second neural network. Moreover, in an implementation that includes a third neural network to receive the two dimensional image and the bird's eye view image and to detect three dimensional objects, having the classification function not be a differentiable function can preclude the ability to use backpropagation to guide training of a combination of the first neural network, the second neural network, and the third neural network. Additionally, not preserving the spatial gradient information associated with the illustration of the object in the depth map can prevent the third neural network from using the spatial gradient information associated with the illustration of the object in the depth map to detect a three dimensional object.

The disclosed technologies address these concerns. The second neural network, according to the disclosed technologies, can implement a machine learning algorithm that preserves spatial gradient information associated with one or more objects included in the depth map. Additionally, the second neural network, according to the disclosed technologies, can implement a machine learning algorithm that causes a position of a pixel in an object, included in the bird's eye view image, to be represented by a differentiable function. For example, the differentiable function can be a Gaussian function and the position of the pixel can correspond to a position of a mean value associated with the Gaussian function. For example, the machine learning algorithm can apply a kernel to preserve the spatial gradient information and to cause the pixel to be represented by the differentiable function. For example, the kernel can be a Gaussian kernel. Alternatively, for example, the kernel can be a squared exponential kernel defined as $e^{(-(x-m)/(s \times s))}$, where x is the position of the pixel, m is a value of a mean of the kernel, and s is a value of a variance of the kernel. In this manner, according to the disclosed technologies, a combination of the first neural network and the second neural network can be end-to-end trainable. Moreover, in an implementation that includes a third neural network, the third neural network can receive the two dimensional image, the bird's eye view image, and the spatial gradient information and can detect three dimensional objects. For example, a combination of the first neural network, the second neural network, and the third neural network can be end-to-end trainable.

Figure 1:
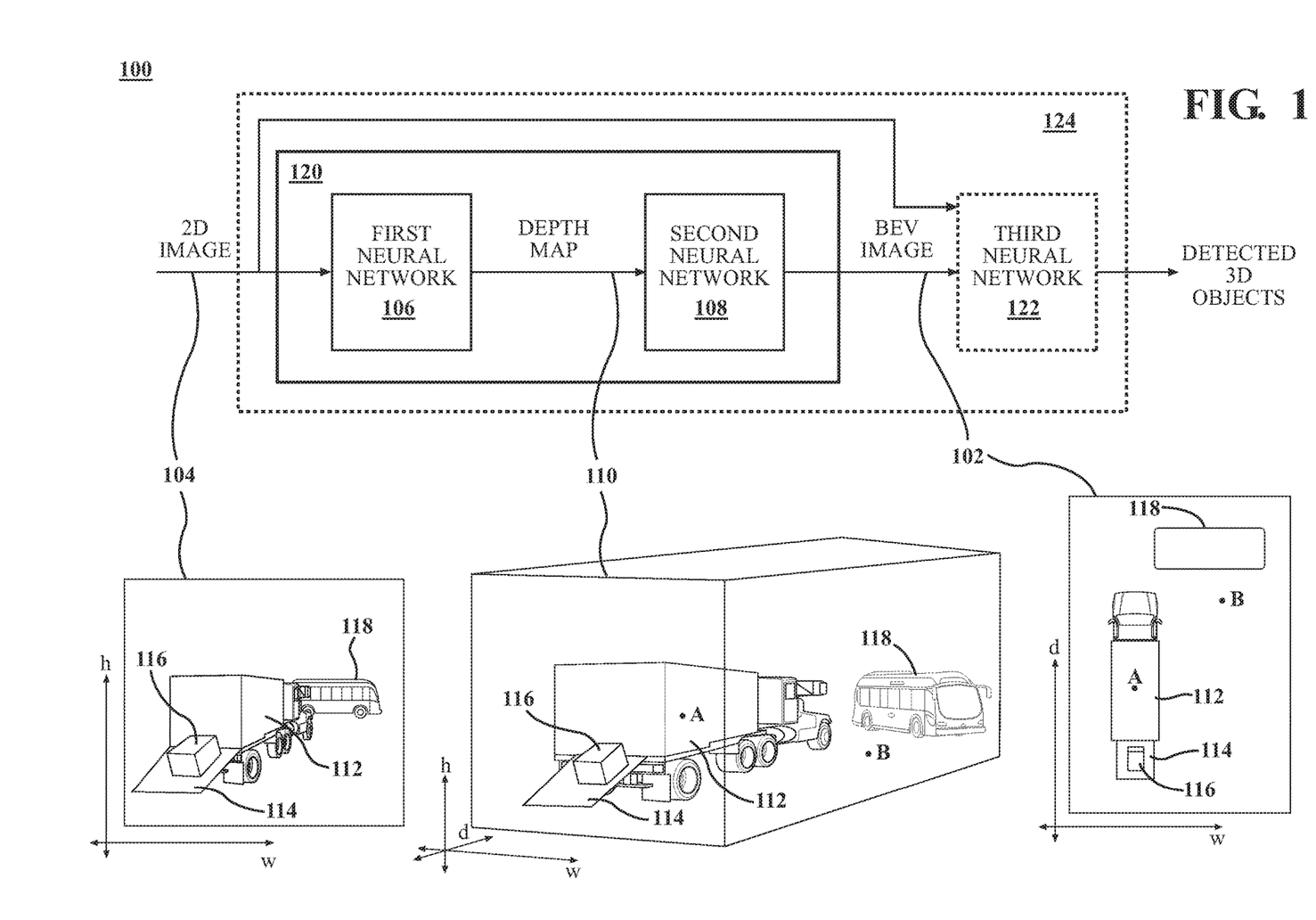
FIG. 1 is a diagram that illustrates an example of an environment for producing a bird's eye view image from a two dimensional image, according to the disclosed technologies.

FIG. 1 is a diagram that illustrates an example of an environment 100 for producing a bird's eye view image 102 from a two dimensional image 104, according to the disclosed technologies. For example, the environment 100 can include a first neural network 106 and a second neural network 108. The first neural network 106 can receive the two dimensional (2D) image 104 and can produce a three dimensional (3D) depth map 110. The second neural network 108 can receive the depth map 110 and can produce the bird's eye view (BEV) image 102.

For example, the two dimensional image 104 can be an illustration of four objects: a truck 112, a ramp 114, a crate 116, and a bus 118. The illustration in the two dimensional image 104 can be with respect to a height (h) dimension and a width (w) dimension. In the two dimensional image 104, a view of the bus 118 can be partially occluded by the truck 112. Additionally, although in reality the truck 112 and the bus 118 can be of comparable size, in the two dimensional image 106, the bus 118 can appear to be smaller than the truck 112.

For example, the depth map 110 can be an illustration of the four objects with respect to the height (h) dimension, the width (w) dimension, and a depth (d) dimension. In the depth map 110, the view of the bus 118 can be not occluded by the truck 112. Additionally, the bus 118 can appear to be of a comparable size to the truck 112 and a distance between the truck 112 and the bus 118 can be perceivable.

For example, the bird's eye view image 102 can be an illustration of the four objects with respect to the depth (d) dimension and the width (w) dimension. In the bird's eye view image 102, the view of the bus 118 can be not occluded by the truck 112. Additionally, the bus 118 can appear to be of the comparable size to the truck 112 and the distance between the truck 112 and the bus 118 can be perceivable.

The second neural network 108 can receive information about a voxel in the depth map 110, can determine if the voxel contributes to an illustration of an object in the depth map 110, and can produce a classification of a pixel in the bird's eye view image 102 that corresponds to the voxel. For example, in response to a determination that a voxel A in the depth map 110 does contribute to an illustration of the truck 112 in the depth map 110, the classification can be that a corresponding pixel A in the bird's eye view image 102 is occupied. For example, in response to a determination that a voxel B in the depth map 110 does not contribute to an illustration of an object in the depth map 110, the classification can be that a corresponding pixel B in the bird's eye view image 102 is unoccupied.

However, additionally, the second neural network 108 can implement a machine learning algorithm that preserves spatial gradient information associated with one or more of the four objects included in the depth map 110. For example, the machine learning algorithm can preserve the spatial gradient information associated with the crate 116 disposed on the ramp 114 included in the depth map 110. Moreover, the second neural network 108 can implement a machine learning algorithm that causes a position of a pixel in an object, included in the bird's eye view image 102, to be represented by a differentiable function. For example, the differentiable function can be a Gaussian function and the position of the pixel can correspond to a position of a mean value associated with the Gaussian function. For example, the machine learning algorithm can apply a kernel to preserve the spatial gradient information and to cause the pixel to be represented by the differentiable function. In this manner, a combination 120 of the first neural network 106 and the second neural network 108 can be end-to-end trainable. Moreover, in an implementation that includes a third neural network 122, the third neural network 122 can receive the two dimensional image 104, the bird's eye view image 102, and the spatial gradient information and can detect three dimensional objects. For example, a combination 124 of the first neural network 106, the second neural network 108, and the third neural network 122 can be end-to-end trainable.

Figure 2:
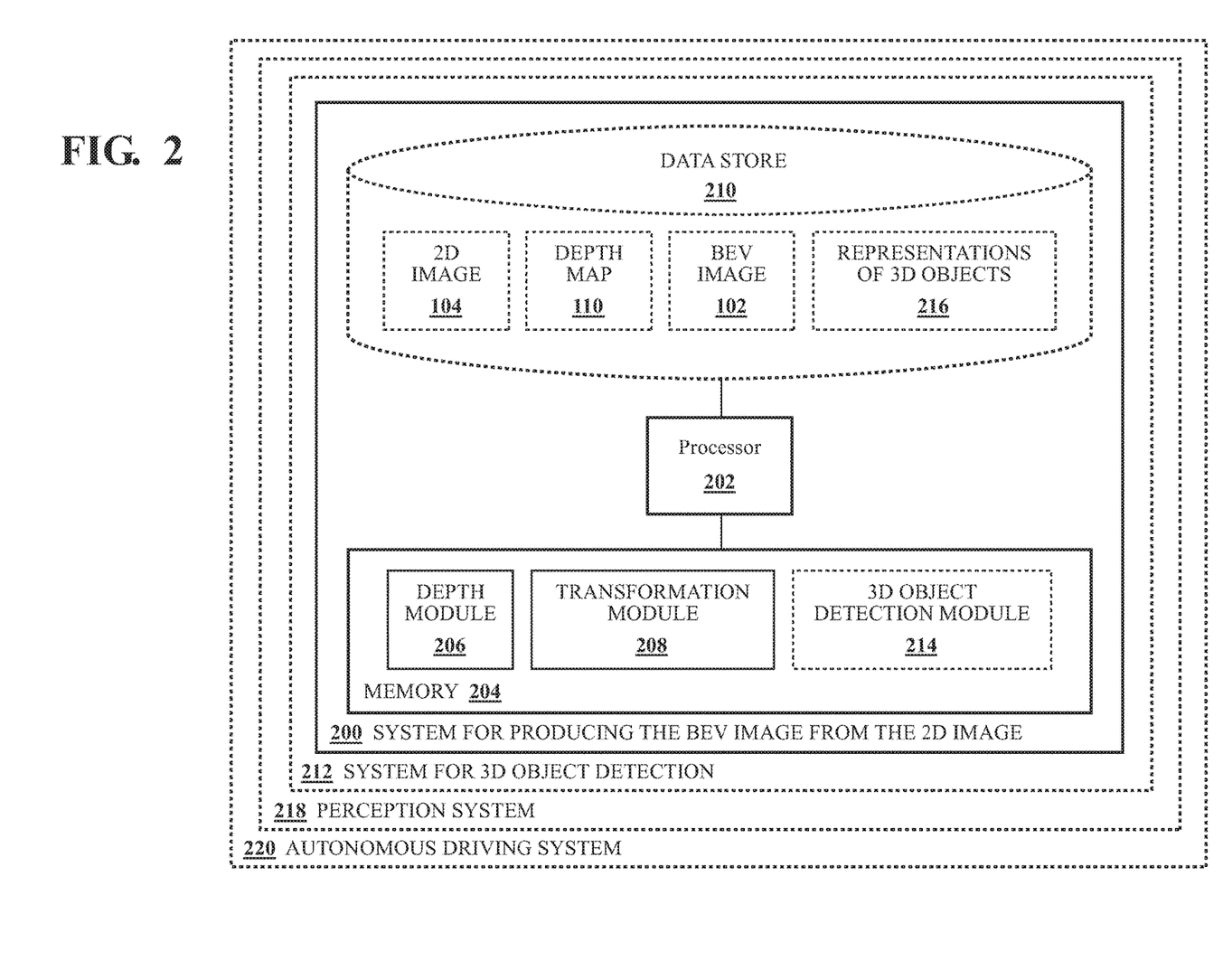
FIG. 2 is a block diagram that illustrates an example of a system for producing the bird's eye view image from the two dimensional image, according to the disclosed technologies.

FIG. 2 is a block diagram that illustrates an example of a system 200 for producing the bird's eye view image 102 from the two dimensional image 104, according to the disclosed technologies. The system 200 can include, for example, a processor 202 and a memory 204. The memory 204 can be communicably coupled to the processor 202. The memory 204 can store, for example, a depth module 206 and a transformation module 208. For example, the depth module 206 can include instructions that function to control the processor 202 to receive the two dimensional image 104 and to execute the first neural network 106 to produce the depth map 110 (illustrated in FIG. 1). For example, the two dimensional image 104 can be a monocular image or a pair of images that comprise a stereo image. For example, the transformation module 208 can include instructions that control the processor 202 to receive the depth map 110 and to execute the second neural network 108 to produce the bird's eye view image 102 (illustrated in FIG. 1).

The second neural network 108 can implement a machine learning algorithm that preserves spatial gradient information associated with one or more objects included in the depth map 110. Moreover, the second neural network 108 can implement a machine learning algorithm that causes a position of a pixel in an object, included in the bird's eye view image 102, to be represented by a differentiable function. For example, the differentiable function can be a Gaussian function and the position of the pixel can correspond to a position of a mean value associated with the Gaussian function. For example, the machine learning algorithm can apply a kernel to preserve the spatial gradient information and to cause the pixel to be represented by the differentiable function. In this manner, the combination 120 (illustrated in FIG. 1) of the first neural network 106 and the second neural network 108 can be end-to-end trainable. For example, the combination 120 can be end-to-end trainable without using a term that is a substitution for photometric loss. (One of skill in the art understands that some techniques to detect three dimensional objects from a two dimensional image can use one or more neural networks that can be trained using a term that is a substitution for photometric loss.) For example, the combination 120 can be end-to-end trainable without depth supervision.

In an embodiment, the system 200 can further include a data store 210. The data store 210 can be communicably coupled to the processor 202. The data store 210 can store, for example, the two dimensional image 104. The data store 210 can store, for example, the depth map 110. The data store 210 can store, for example, the bird's eye view image 102.

In an embodiment, the system 200 can be a subsystem of a system 212 for three dimensional object detection. In this embodiment, the memory 204 can further store a three dimensional object detection module 214. For example, the three dimensional objection detection module 214 can include instructions that function to control the processor 202 to receive the two dimensional image 104, the bird's eye view image 102, and the spatial gradient information and to execute the third neural network 122 (illustrated in FIG. 1) to detect one or more three dimensional objects. The system 212 can include the first neural network 106, the second neural network 108, and the third neural network 122. In an alternative of this embodiment, the system 200 can further include the data store 210. The data store 210 can be communicably coupled to the processor 202. The data store 210 can store, for example, one or more representations 216 for the one or more three dimensional objects. For example, the combination 124 (illustrated in FIG. 1) of the first neural network 106, the second neural network 108, and the third neural network 122 can be end-to-end trainable.

In an embodiment, the system 212 can be a subsystem of a perception system 218.

In an embodiment, the perception system 218 can be a subsystem of an autonomous driving system 220.

Figure 3:
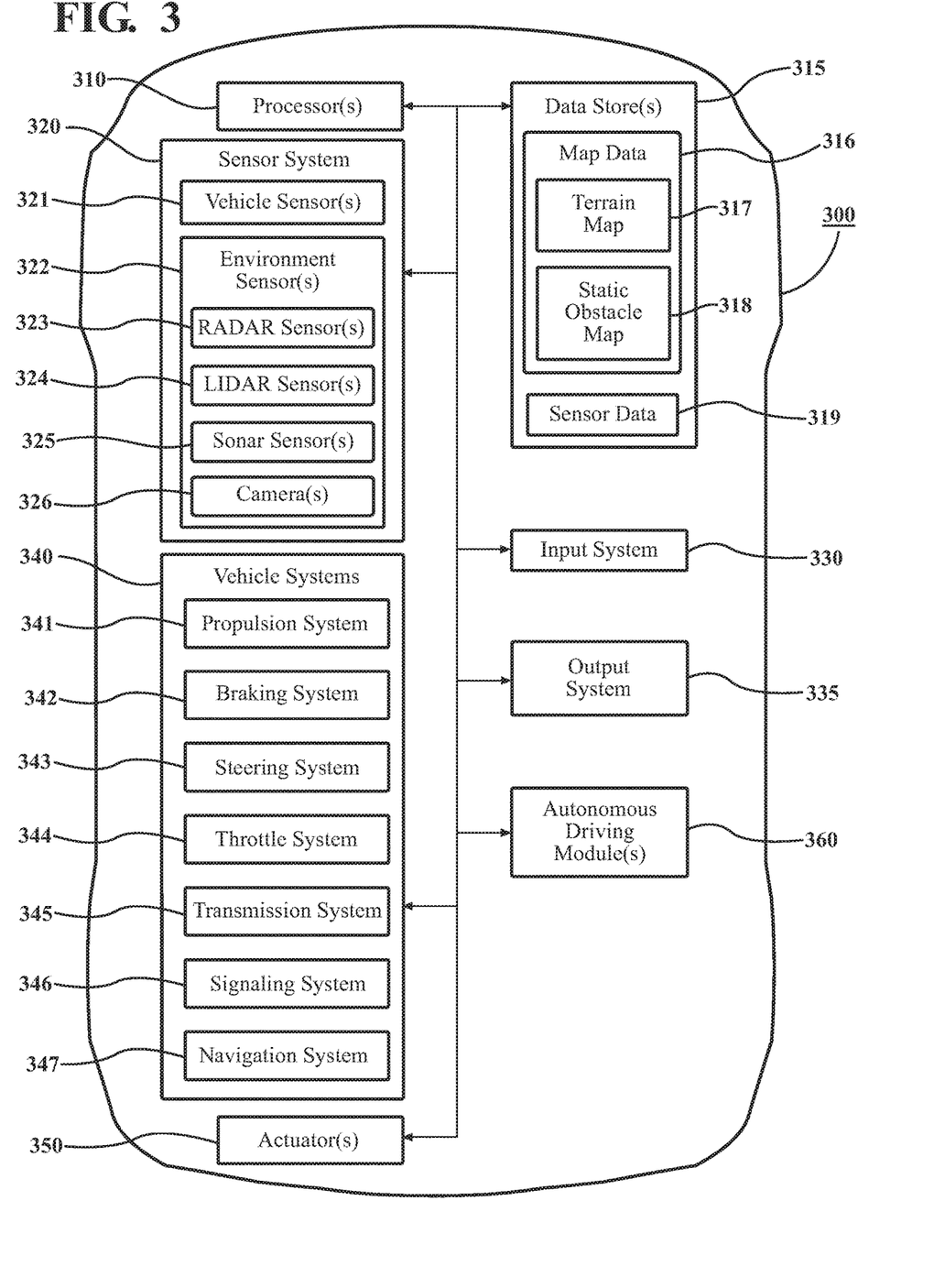
FIG. 3 is a block diagram that illustrates an example of elements disposed on a vehicle, according to the disclosed technologies.

FIG. 3 is a block diagram that illustrates an example of elements disposed on a vehicle 300, according to the disclosed technologies. As used herein, a "vehicle" can be any form of powered transport. In one or more implementations, the vehicle 300 can be an automobile. While arrangements described herein are with respect to automobiles, one of skill in the art understands, in light of the description herein, that embodiments are not limited to automobiles.

In some embodiments, the vehicle 300 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 300 is performed according to inputs received from a user (e.g., human driver). In one or more arrangements, the vehicle 300 can be a conventional vehicle that is configured to operate in only a manual mode.

In one or more embodiments, the vehicle 300 can be an autonomous vehicle. As used herein, "autonomous vehicle" can refer to a vehicle that operates in an autonomous mode. As used herein, "autonomous mode" can refer to navigating and/or maneuvering the vehicle 300 along a travel route using one or more computing systems to control the vehicle 300 with minimal or no input from a human driver. In one or more embodiments, the vehicle 300 can be highly automated or completely automated. In one embodiment, the vehicle 300 can be configured with one or more semi-autonomous operational modes in which one or more computing systems perform a portion of the navigation and/or maneuvering of the vehicle along a travel route, and a vehicle operator (i.e., driver) provides inputs to the vehicle 300 to perform a portion of the navigation and/or maneuvering of the vehicle 300 along a travel route.

The vehicle 300 can include various elements. The vehicle 300 can have any combination of the various elements illustrated in FIG. 3. In various embodiments, it may not be necessary for the vehicle 300 to include all of the elements illustrated in FIG. 3. Furthermore, the vehicle 300 can have elements in addition to those illustrated in FIG. 3. While the various elements are illustrated in FIG. 3 as being located within the vehicle 300, one or more of these elements can be located external to the vehicle 300. Furthermore, the elements illustrated may be physically separated by large distances. For example, as described, one or more components of the disclosed system can be implemented within the vehicle 300 while other components of the system can be implemented within a cloud-computing environment, as described below. For example, the elements can include one or more processors 310, one or more data stores 315, a sensor system 320, an input system 330, an output system 335, vehicle systems 340, one or more actuators 350, and one or more autonomous driving modules 360.

In one or more arrangements, the one or more processors 310 can be a main processor of the vehicle 300. For example, the one or more processors 310 can be an electronic control unit (ECU). For example, functions and/or operations of the processor 202 (illustrated in FIG. 2) can be realized by the one or more processors 310.

The one or more data stores 315 can store, for example, one or more types of data. For example, functions and/or operations of the memory 204 and/or the data store 210 (illustrated in FIG. 2) can be realized by the one or more data stores 315. The one or more data store 315 can include volatile memory and/or non-volatile memory. Examples of suitable memory for the one or more data stores 315 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 315 can be a component of the one or more processors 310. Additionally or alternatively, the one or more data stores 315 can be operatively connected to the one or more processors 310 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 315 can store map data 316. The map data 316 can include maps of one or more geographic areas. In some instances, the map data 316 can include information or data on roads, traffic control devices, road markings, structures, features, and/or landmarks in the one or more geographic areas. The map data 316 can be in any suitable form. In some instances, the map data 316 can include aerial views of an area. In some instances, the map data 316 can include ground views of an area, including 360-degree ground views. The map data 316 can include measurements, dimensions, distances, and/or information for one or more items included in the map data 316 and/or relative to other items included in the map data 316. The map data 316 can include a digital map with information about road geometry. The map data 316 can be high quality and/or highly detailed.

In one or more arrangements, the map data 316 can include one or more terrain maps 317. The one or more terrain maps 317 can include information about the ground, terrain, roads, surfaces, and/or other features of one or more geographic areas. The one or more terrain maps 317 can include elevation data of the one or more geographic areas. The map data 316 can be high quality and/or highly detailed. The one or more terrain maps 317 can define one or more ground surfaces, which can include paved roads, unpaved roads, land, and other things that define a ground surface.

In one or more arrangements, the map data 316 can include one or more static obstacle maps 318. The one or more static obstacle maps 318 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 318 can have location data, size data, dimension data, material data, and/or other data associated with them. The one or more static obstacle maps 318 can include measurements, dimensions, distances, and/or information for one or more static obstacles. The one or more static obstacle maps 318 can be high quality and/or highly detailed. The one or more static obstacle maps 318 can be updated to reflect changes within a mapped area.

In one or more arrangements, the one or more data stores 315 can store sensor data 319. As used herein, "sensor data" can refer to any information about the sensors with which the vehicle 300 can be equipped including the capabilities of and other information about such sensors. The sensor data 319 can relate to one or more sensors of the sensor system 320. For example, in one or more arrangements, the sensor data 319 can include information about one or more LIDAR sensors 324 of the sensor system 320.

In some arrangements, at least a portion of the map data 316 and/or the sensor data 319 can be located in one or more data stores 315 that are located onboard the vehicle 300. Alternatively or additionally, at least a portion of the map data 316 and/or the sensor data 319 can be located in one or more data stores 315 that are located remotely from the vehicle 300.

The sensor system 320 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 320 includes a plurality of sensors, the sensors can work independently from each other. Alternatively, two or more of the sensors can work in combination with each other. In such a case, the two or more sensors can form a sensor network. The sensor system 320 and/or the one or more sensors can be operatively connected to the one or more processors 310, the one or more data stores 315, and/or another element of the vehicle 300 (including any of the elements illustrated in FIG. 3). The sensor system 320 can acquire data of at least a portion of the external environment of the vehicle 300 (e.g., nearby vehicles). The sensor system 320 can include any suitable type of sensor. Various examples of different types of sensors are described herein. However, one of skill in the art understands that the embodiments are not limited to the particular sensors described herein.

The sensor system 320 can include one or more vehicle sensors 321. The one or more vehicle sensors 321 can detect, determine, and/or sense information about the vehicle 300 itself. In one or more arrangements, the one or more vehicle sensors 321 can be configured to detect and/or sense position and orientation changes of the vehicle 300 such as, for example, based on inertial acceleration. In one or more arrangements, the one or more vehicle sensors 321 can include one or more accelerometers, one or more gyroscopes, an inertial measurement unit (IMU), a dead-reckoning system, a global navigation satellite system (GNSS), a global positioning system (GPS), a navigation system 347, and/or other suitable sensors. The one or more vehicle sensors 321 can be configured to detect and/or sense one or more characteristics of the vehicle 300. In one or more arrangements, the one or more vehicle sensors 321 can include a speedometer to determine a current speed of the vehicle 300.

Alternatively or additionally, the sensor system 320 can include one or more environment sensors 322 configured to acquire and/or sense driving environment data. As used herein, "driving environment data" can include data or information about the external environment in which a vehicle is located or one or more portions thereof. For example, the one or more environment sensors 322 can be configured to detect, quantify, and/or sense obstacles in at least a portion of the external environment of the vehicle 300 and/or information/data about such obstacles. Such obstacles may be stationary objects and/or dynamic objects. The one or more environment sensors 322 can be configured to detect, measure, quantify, and/or sense other things in the external environment of the vehicle 300 such as, for example, lane markers, signs, traffic lights, traffic signs, lane lines, crosswalks, curbs proximate the vehicle 300, off-road objects, etc.

Various examples of sensors of the sensor system 320 are described herein. The example sensors may be part of the one or more vehicle sensors 321 and/or the one or more environment sensors 322. However, one of skill in the art understands that the embodiments are not limited to the particular sensors described.

In one or more arrangement, the one or more environment sensors 322 can include one or more radar sensors 323, one or more LIDAR sensors 324, one or more sonar sensors 325, and/or one more cameras 326. In one or more arrangements, the one or more cameras 326 can be one or more high dynamic range (HDR) cameras or one or more infrared (IR) cameras. For example, the two dimensional image 104 (illustrated in FIG. 1) can be captured by the one or more cameras 326.

The input system 330 can include any device, component, system, element, arrangement, or groups thereof that enable information/data to be entered into a machine. The input system 330 can receive an input from a vehicle passenger (e.g., a driver or a passenger). The output system 335 can include any device, component, system, element, arrangement, or groups thereof that enable information/data to be presented to a vehicle passenger (e.g., a driver or a passenger).

Various examples of the one or more vehicle systems 340 are illustrated in FIG. 3. However, one of skill in the art understands that the vehicle 300 can include more, fewer, or different vehicle systems. Although particular vehicle systems can be separately defined, each or any of the systems or portions thereof may be otherwise combined or segregated via hardware and/or software within the vehicle 300. For example, the one or more vehicle systems 340 can include a propulsion system 341, a braking system 342, a steering system 343, a throttle system 344, a transmission system 345, a signaling system 346, and/or the navigation system 347. Each of these systems can include one or more devices, components, and/or a combination thereof, now known or later developed.

The navigation system 347 can include one or more devices, applications, and/or combinations thereof, now known or later developed, configured to determine the geographic location of the vehicle 300 and/or to determine a travel route for the vehicle 300. The navigation system 347 can include one or more mapping applications to determine a travel route for the vehicle 300. The navigation system 347 can include a global positioning system, a local positioning system, a geolocation system, and/or a combination thereof.

The one or more actuators 350 can be any element or combination of elements operable to modify, adjust, and/or alter one or more of the vehicle systems 340 or components thereof responsive to receiving signals or other inputs from the one or more processors 310 and/or the one or more autonomous driving modules 360. Any suitable actuator can be used. For example, the one or more actuators 350 can include motors, pneumatic actuators, hydraulic pistons, relays, solenoids, and/or piezoelectric actuators.

The one or more processors 310 and/or the one or more autonomous driving modules 360 can be operatively connected to communicate with the various vehicle systems 340 and/or individual components thereof. For example, the one or more processors 310 and/or the one or more autonomous driving modules 360 can be in communication to send and/or receive information from the various vehicle systems 340 to control the movement, speed, maneuvering, heading, direction, etc. of the vehicle 300. The one or more processors 310 and/or the one or more autonomous driving modules 360 may control some or all of these vehicle systems 340 and, thus, may be partially or fully autonomous.

The one or more processors 310 and/or the one or more autonomous driving modules 360 may be operable to control the navigation and/or maneuvering of the vehicle 300 by controlling one or more of the vehicle systems 340 and/or components thereof. For example, when operating in an autonomous mode, the one or more processors 310 and/or the one or more autonomous driving modules 360 can control the direction and/or speed of the vehicle 300. The one or more processors 310 and/or the one or more autonomous driving modules 360 can cause the vehicle 300 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 300 can include one or more modules, at least some of which are described herein. The modules can be implemented as computer-readable program code that, when executed by the one or more processors 310, implement one or more of the various processes described herein. One or more of the modules can be a component of the one or more processors 310. Alternatively or additionally, one or more of the modules can be executed on and/or distributed among other processing systems to which the one or more processors 310 can be operatively connected. The modules can include instructions (e.g., program logic) executable by the one or more processors 310. Alternatively or additionally, the one or more data store 315 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 300 can include one or more autonomous driving modules 360. The one or more autonomous driving modules 360 can be configured to receive data from the sensor system 320 and/or any other type of system capable of capturing information relating to the vehicle 300 and/or the external environment of the vehicle 300. In one or more arrangements, the one or more autonomous driving modules 360 can use such data to generate one or more driving scene models. The one or more autonomous driving modules 360 can determine position and velocity of the vehicle 300. The one or more autonomous driving modules 360 can determine the location of obstacles, obstacles, or other environmental features including traffic signs, trees, shrubs, neighboring vehicles, pedestrians, etc. For example, functions and/or operations of the autonomous driving system 220 (illustrated in FIG. 2) can be realized by the one or more autonomous driving modules 360.

The one or more autonomous driving modules 360 can be configured to receive and/or determine location information for obstacles within the external environment of the vehicle 300 for use by the one or more processors 310 and/or one or more of the modules described herein to estimate position and orientation of the vehicle 300, vehicle position in global coordinates based on signals from a plurality of satellites, or any other data and/or signals that could be used to determine the current state of the vehicle 300 or determine the position of the vehicle 300 with respect to its environment for use in either creating a map or determining the position of the vehicle 300 in respect to map data.

The one or more autonomous driving modules 360 can be configured to determine one or more travel paths, current autonomous driving maneuvers for the vehicle 300, future autonomous driving maneuvers and/or modifications to current autonomous driving maneuvers based on data acquired by the sensor system 320, driving scene models, and/or data from any other suitable source such as determinations from the sensor data 319. As used herein, "driving maneuver" can refer to one or more actions that affect the movement of a vehicle. Examples of driving maneuvers include: accelerating, decelerating, braking, turning, moving in a lateral direction of the vehicle 300, changing travel lanes, merging into a travel lane, and/or reversing, just to name a few possibilities. The one or more autonomous driving modules 360 can be configured to implement determined driving maneuvers. The one or more autonomous driving modules 360 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 360 can be configured to execute various vehicle functions and/or to transmit data to, receive data from, interact with, and/or control the vehicle 300 or one or more systems thereof (e.g., one or more of vehicle systems 340).

Figure 4:
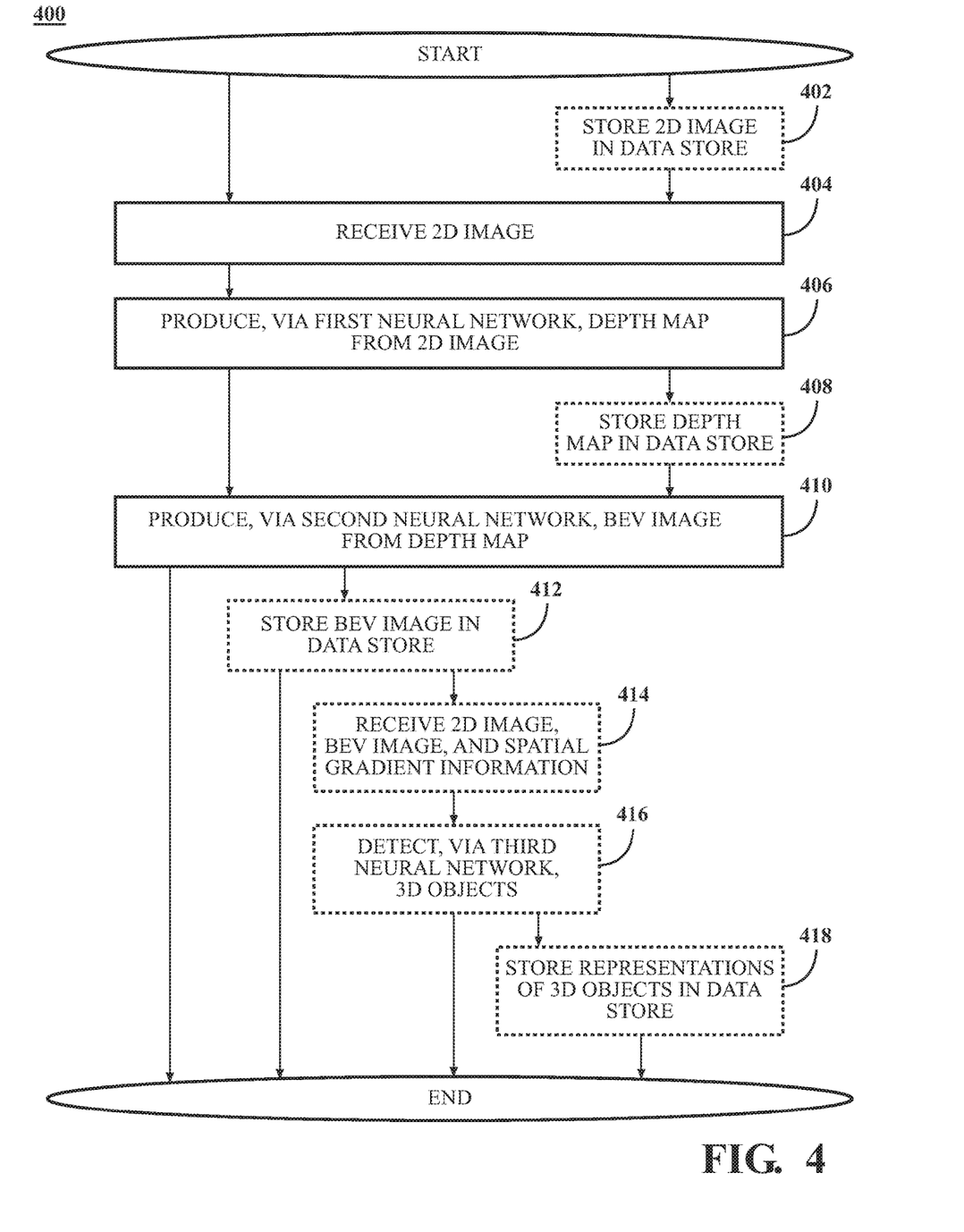
FIG. 4 is a flow diagram that illustrates an example of a method that is associated with producing the bird's eye view image from the two dimensional image, according to the disclosed technologies.

FIG. 4 is a flow diagram that illustrates an example of a method 400 that is associated with producing the bird's eye view image 102 from the two dimensional image 104, according to the disclosed technologies. The method 400 is described from the perspective of the system 200 or the system 212 illustrated in FIG. 2. Although the method 400 is described in combination with the system 200 or the system 212, one of skill in the art understands, in light of the description herein, that the method 400 is not limited to being implemented by the system 200 or the system 212. Rather, the system 200 and the system 212 are two examples of a system that may be used to implement the method 400.

In the method 400, at an operation 402, the processor 202 can store the two dimensional image 104 in the data store 210. For example, the two dimensional image 104 can be a monocular image or a pair of images that comprise a stereo image.

At an operation 404, the processor 202 can receive the two dimensional image 104.

At an operation 406, the processor 202, via the first neural network 106, can produce the depth map 110 from the two dimensional image 104.

At an operation 408, the processor 202 can store the depth map 110 in the data store 210.

At an operation 410, the processor 202, via the second neural network 108, can produce the bird's eye view image 102 from the depth map 110. The second neural network 108 can implement a machine learning algorithm that preserves spatial gradient information associated with one or more objects included in the depth map 110. The second neural network 108 can implement a machine learning algorithm that causes a position of a pixel in an object, included in the bird's eye view image 102, to be represented by a differentiable function. For example, the differentiable function can be a Gaussian function and the position of the pixel can correspond to a position of a mean value associated with the Gaussian function.

At an operation 412, the processor 202 can store the bird's eye view image 102 in the data store 210.

At an operation 414, the processor 202 can receive the two dimensional image 104, the bird's eye view image 102, and the spatial gradient information.

At an operation 416, the processor 202, via the third neural network 122, can detect one or more three dimensional objects.

At an operation 418, the processor 202 can store one or more representations of the one or more three dimensional objects in the data store 210.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for producing a bird's eye view image from a two dimensional image, the system comprising:
   one or more processors; and
   a memory communicably coupled to the one or more processors and storing:
   a depth module including instructions that when executed by the one or more processors cause the one or more processors to receive the two dimensional image and to execute a first neural network to produce a depth map; and
   a transformation module including instructions that when executed by the one or more processors cause the one or more processors to receive the depth map and to execute a second neural network to produce the bird's eye view image,
   wherein the second neural network implements a machine learning algorithm that:
   preserves spatial gradient information associated with one or more objects included in the depth map, and
   causes a position of a pixel in an object, included in the bird's eye view image, to be represented by a differentiable function so that a combination of the first neural network and the second neural network is end-to-end trainable from a training output of the second neural network to a training input of the first neural network, wherein adjustments to weights of nodes of the combination of the first neural network and the second neural network, during a backward phase of a training of the combination of the first neural network and the second neural network, are guided by partial derivatives of a single loss function.

2. The system of claim 1, wherein the combination is end-to-end trainable without using a term that is a substitution for photometric loss.

3. The system of claim 1, wherein the combination is end-to-end trainable without depth supervision.

4. The system of claim 1, further comprising a data store communicably coupled to the one or more processors and storing the two dimensional image.

5. The system of claim 4, wherein the data store is further configured to store the depth map.

6. The system of claim 4, wherein the data store is further configured to store the bird's eye view image.

7. The system of claim 1, wherein the system is a subsystem of a system for three dimensional object detection.

8. The system of claim 7, wherein the memory further stores a three dimensional object detection module that when executed by the one or more processors cause the one or more processors to:
   receive the two dimensional image, the bird's eye view image, and the spatial gradient information; and
   execute a third neural network to detect one or more three dimensional objects,
   wherein the system for three dimensional object detection includes the first neural network, the second neural network, and the third neural network.

9. The system of claim 8, further comprising a data store communicably coupled to the one or more processors and configured to store one or more representations for the one or more three dimensional objects.

10. The system of claim 8, wherein a combination of the first neural network, the second neural network, and the third neural network is end-to-end trainable.

11. The system of claim 7, wherein the system for three dimensional object detection is a subsystem of a perception system.

12. The system of claim 11, wherein the perception system is a subsystem of an autonomous driving system.

13. A method for producing a bird's eye view image from a two dimensional image, the method comprising:
   receiving, by a processor, the two dimensional image;
   producing, by the processor via a first neural network, a depth map from the two dimensional image;
   producing, by the processor via a second neural network, the bird's eye view image from the depth map, wherein the second neural network implements a machine learning algorithm that:
   preserves spatial gradient information associated with one or more objects included in the depth map, and
   causes a position of a pixel in an object, included in the bird's eye view image, to be represented by a differentiable function so that a combination of the first neural network and the second neural network is end-to-end trainable from a training output of the second neural network to a training input of the first neural network, wherein adjustments to weights of nodes of the combination of the first neural network and the second neural network, during a backward phase of a training of the combination of the first neural network and the second neural network, are guided by partial derivatives of a single loss function.

14. The method of claim 13, wherein the differentiable function is a Gaussian function and the position of the pixel corresponds to a position of a mean value associated with the Gaussian function.

15. The method of claim 13, wherein the two dimensional image comprises a monocular image.

16. The method of claim 13, wherein the two dimensional image comprises a pair of images, the pair of images comprising a stereo image.

17. The method of claim 13, wherein the machine learning algorithm applies a kernel to preserve the spatial gradient information and to cause the pixel to be represented by the differentiable function.

18. The method of claim 13, further comprising:
   receiving, by the processor, the two dimensional image, the bird's eye view image, and the spatial gradient information; and
   detecting, by the processor via a third neural network, one or more three dimensional objects.

19. A non-transitory computer-readable medium for producing a bird's eye view image from a two dimensional image, the non-transitory computer-readable medium including instructions that when executed by one or more processors cause the one or more processors to:
   receive the two dimensional image;
   produce, via a first neural network, a depth map from the two dimensional image;
   produce, via a second neural network, the bird's eye view image from the depth map, wherein the second neural network implements a machine learning algorithm that:
      preserves spatial gradient information associated with one or more objects included in the depth map, and
      causes a position of a pixel in an object, included in the bird's eye view image, to be represented by a differentiable function so that a combination of the first neural network and the second neural network is end-to-end trainable from a training output of the second neural network to a training input of the first neural network, wherein adjustments to weights of nodes of the combination of the first neural network and the second neural network, during a backward phase of a training of the combination of the first neural network and the second neural network, are guided by partial derivatives of a single loss function.

20. A method for producing a bird's eye view image from a two dimensional image, the method comprising:
   receiving, by a processor, the two dimensional image;
   producing, by the processor via a first neural network, a depth map from the two dimensional image;
   producing, by the processor via a second neural network, the bird's eye view image from the depth map, wherein the second neural network implements a machine learning algorithm that:
      preserves spatial gradient information associated with one or more objects included in the depth map, and
      causes a position of a pixel in an object, included in the bird's eye view image, to be represented by a differentiable function, wherein a combination of the first neural network and the second neural network is end-to-end trainable,
   wherein the machine learning algorithm applies a kernel to preserve the spatial gradient information and to cause the pixel to be represented by the differentiable function, and
   wherein the kernel comprises a squared exponential kernel defined as $e^{(-(x-m)/(s \times s))}$, where x is the position of the pixel, m is a value of a mean of the kernel, and s is a value of a variance of the kernel.

21. A system, comprising:
   a processor; and
   a memory storing a module including instructions that cause the processor to:
      operate, on a two-dimensional image, a first neural network to produce a depth map; and
      operate, on the depth map, a second neural network to produce a bird's eye view image,
   wherein a position of a pixel, included in the bird's eye view image, is represented by a differentiable function so that a combination of the first neural network and the second neural network is end-to-end from a training output of the second neural network to a training input of the first neural network, wherein adjustments to weights of nodes of the combination of the first neural network and the second neural network, during a backward phase of a training of the combination of the first neural network and the second neural network, are guided by partial derivatives of a single loss function.

* * * * *

UNITED STATES PATENT AND TRADEMARK OFFICE
CERTIFICATE OF CORRECTION

PATENT NO. : 12,175,775 B2  Page 1 of 1
APPLICATION NO. : 16/898506
DATED : December 24, 2024
INVENTOR(S) : Guizilini et al.

It is certified that error appears in the above-identified patent and that said Letters Patent is hereby corrected as shown below:

In the Claims

Column 18, Claim 21, Line 34: delete "end-to-end from" and insert --end-to-end trainable from--.

Signed and Sealed this
Twenty-first Day of January, 2025

Coke Morgan Stewart
*Acting Director of the United States Patent and Trademark Office*